United States Patent

[11] 3,603,182

| [72] | Inventors | Robert M. Jackman;<br>William N. McDonald, both of Little Rock, Ark. |
|---|---|---|
| [21] | Appl. No. | 823,627 |
| [22] | Filed | May 12, 1969 |
| [45] | Patented | Sept. 7, 1971 |
| [73] | Assignee | A. O. Smith-Inland Inc.<br>Milwaukee, Wis. |

[54] SPIGOT-FORMING TOOL
9 Claims, 7 Drawing Figs.

[52] U.S. Cl. ................................................ 82/4 C
[51] Int. Cl. ................................................ B23b 5/16
[50] Field of Search ........................................ 82/4.3

[56] References Cited
UNITED STATES PATENTS

| 1,811,894 | 6/1931 | Parker | 82/4 |
|---|---|---|---|
| 2,607,376 | 8/1952 | Montgomery | 82/4 |
| 3,361,017 | 1/1968 | Baumgarten | 82/4 |

FOREIGN PATENTS

| 311,318 | 1/1956 | Switzerland | 82/4 (.3) |

*Primary Examiner*—Leonidas Vlachos
*Attorney*—Andrus, Sceales, Starke & Sawall

ABSTRACT: A spigot-forming tool designed to taper spigot ends of fiber-reinforced plastic hollow articles for fitting into a bell end of another plastic article has a cylinder which fits into the spigot end and serves as a supporting surface for the article wall. A cutting blade is disposed adjacent the outside surface of the spigot end in alignment with the longitudinal axis of the cylinder and is supported by a carriage and head bar attached to the cylinder. The carriage is removably attached to the head bar at a predetermined number of positions in accordance with the varying sizes of articles, and the attachment construction automatically disposes the carriage and blade at the desired spigot-taper angle for the particular size plastic article.

PATENTED SEP 7 1971
3,603,182
SHEET 1 OF 2
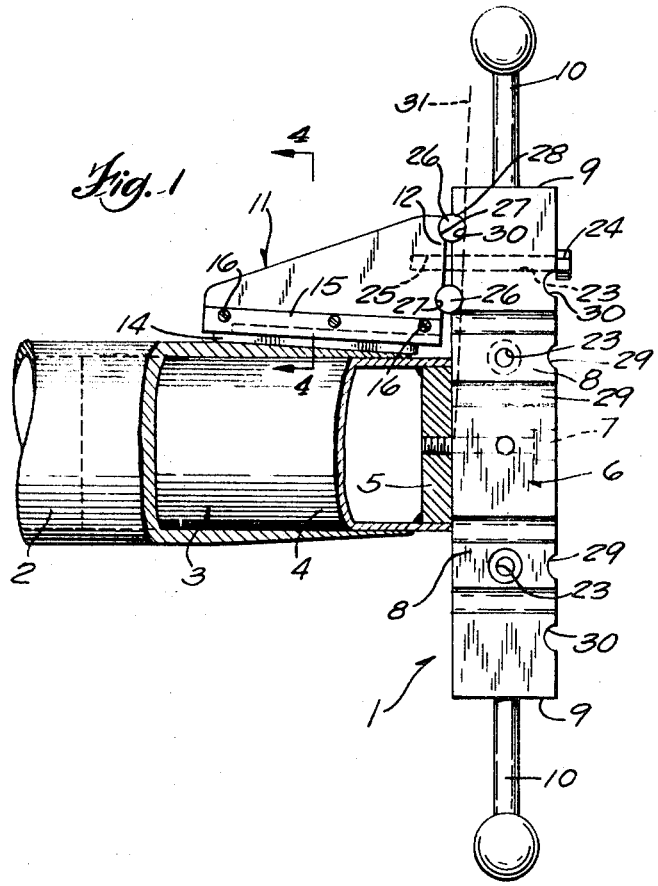
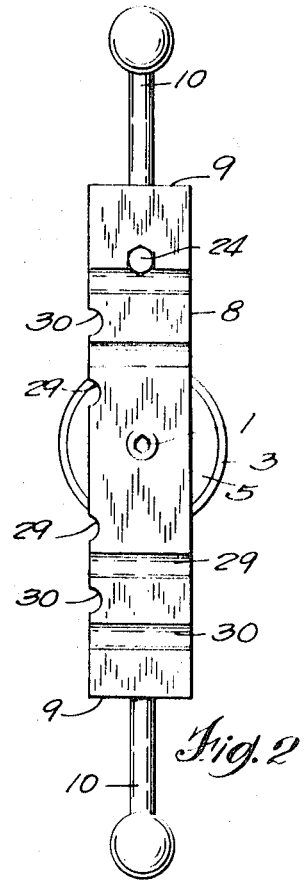
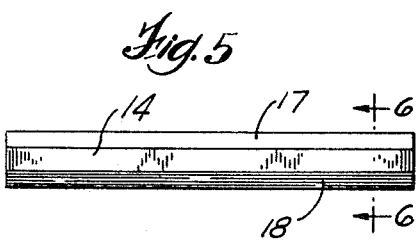
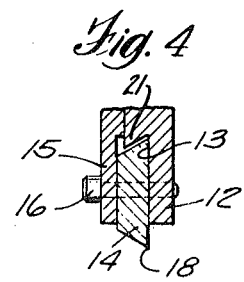
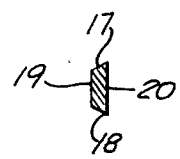
Inventors
Robert M. Jackman
William N. McDonald
By
Andrus, Sceales, Starke & Sawall
Attorneys

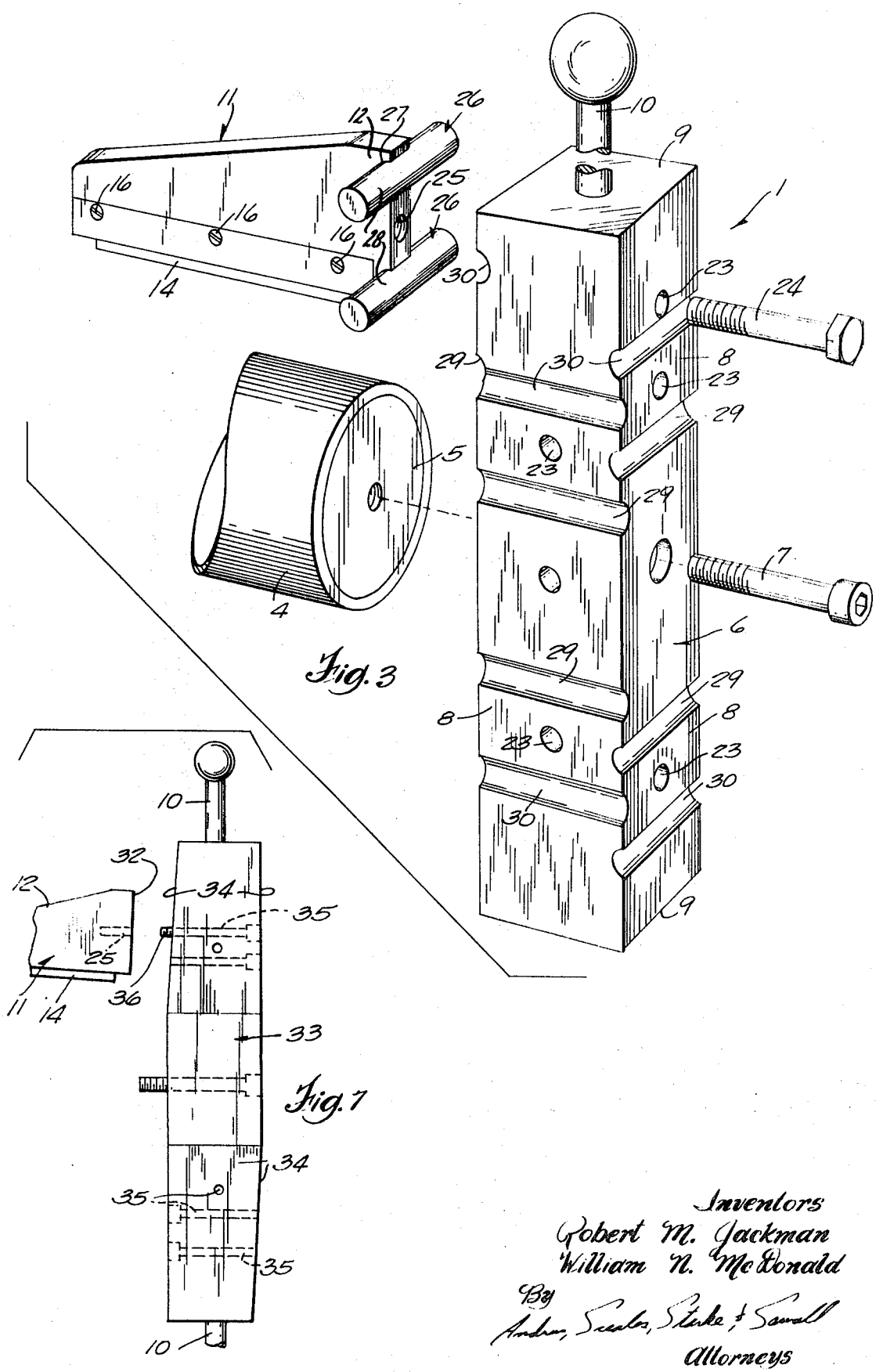

3,603,182

SPIGOT-FORMING TOOL

This invention relates to a spigot-forming tool for tapering or reducing the wall thickness of hollow articles. The apparatus of the invention is particularly adapted to taper the end surface of plastic tubular articles.

BACKGROUND OF THE INVENTION

It is desired to use bell and spigot ends in connecting tubular articles, such as plastic pipe or conduit. Moderately tapered, complementing bell and spigot ends, to which an adhesive is applied, provide high strength bonds when the spigot end is fitted to the bell end, and field construction of pipelines is facilitated by the bell-spigot method of connecting pipe lengths.

Tools have been provided which made is possible to form the spigot ends of pipe right in the field. Thus, pipe could be manufactured in uniform lengths, and during construction, a pipeline could be cut where needed, as for bends. The spigot end would then be formed in the field and the pipe connected to a bell end on the next pipe in the line.

These spigot tools solved manufacturing problems as well. Plastic pipe is usually manufactured by extrusion of a plastic material or by application of a plastic filament or tape to a winding mandrel. Extruded tubing previously required specially fabricated bell and spigot fixtures which had to be attached or bonded to the pipe lengths. This added cost and manufacturing time, but the spigot-forming tools permitted forming a spigot directly on the open end of a pipe length, thus eliminating the necessity of fabricating extra pieces.

As well, the manufacture of plastic pipe on a mandrel previously required the use of special mandrel fixtures in order to manufacture bell and spigot ends. Again, the new spigot tools, by forming the spigots directly on the pipe, eliminated this more costly and complicated manner of manufacture.

A problem arose with spigot-forming tools, however, in that uniformity of the tapered ends was inadequate, thus hampering proper bonding. Fiber-reinforced plastic pipe is manufactured by winding a filament or a tape comprised of reinforcing fibers over a mandrel in combination with a thermosetting resin. The resulting pipe has an inner diameter closely conforming to the outer diameter of the mandrel, and the outer diameter of the pipe tends to be irregular. Spigot-forming tools had expandable mandrels which were inserted within the pipe end and then expanded into compressive contact with the inside of the pipe. A cutting tool was used in combination with the expandable mandrel and utilized the longitudinal axis of the mandrel as a gauge in machining a tapered end on the pipe. This type apparatus caused irregular spigot ends to be produced. A new, prior art device changed this method and provided a cylindrical mandrel of slightly smaller diameter than the inner diameter of the pipe. This device did not stress the pipe in the spigot-cutting operation and used the cylindrical surface as a gauging reference, improving greatly the uniformity of the spigot taper. Reliable, high-strength bonding was therefore provided for pipe spigot and bell ends and especially for such connections in fiber-reinforced plastic pipe.

It has been found that the spigot ends should be tapered between 1° and 5° with respect to the longitudinal axis of the pipe. The precise angle, however, will vary with different size pipes having different wall thickness. The manufacturer of the pipe will usually specify the proper taper. Previous devices, including the new prior art device described above, either did not account for this variance or did not provide apparatus which could be easily adjusted to more than a few angles to accommodate the numerous size and taper angles desired. Additionally, in prior devices, extra parts or complicated tools were needed to provide adequate adjustability.

Further, the devices which had adjustable cutting angles provided complicated apparatus requiring skill to properly employ. Even skilled operators experienced errors, since there was no way provided by which errors in the cutting tool setting could be detected. Thus, improper spigot-bell bonding occurred, as sometimes the wrong taper angle would be cut in the pipe end.

SUMMARY OF THE INVENTION

The invention here is a sophisticated apparatus, which solves the above difficulties in the prior art devices and expands the use of spigot tools. Other advantages will be apparent from the detailed description.

The invention provides a spigot tool which is adaptable for use with a variety of pipe sizes or other hollow articles and permits adjustment to a variety of taper angles. Errors in taper angle are precluded by structure which automatically adjusts to the proper taper angle as the tool is adjusted to a pipe size. Also, the proper positioning of the cutting tool is assured.

The structure of the invention is advantageously umcomplicated and easy to use, yet accurate even for use by unskilled operators. The invention utilizes a plurality of mandrels, one each for a particular size of pipe. The mandrels are of the type provided in the new prior art device described. One is selected and fitted within a spigot end of a hollow article. A head is removably attached to the selected mandrel and a blade support or carriage is removably attached to the head in a position of general alignment with the longitudinal axis of the mandrel. The carriage holds a cutting blade and is attached to a designated support surface of the head, this setting corresponding to the size of the mandrel. The support surface has an orientation portion and the carriage has a guide surface portion that engages the selected orientation portion to thus determine the angle of the carriage, which, thereby positions the blade at the proper taper angle. A plurality of attachment settings are provided, one each as for a number of pipe sizes desired and at each position the carriage is attached or spaced to position the blades at the taper angle best for that size pipe.

Further, the blade is shaped to fit into a channel in the carriage for attachment and the blade can be fitted only if it is in the proper position.

Thus, the invention eliminates the possibility of errors in operation and provides spigot-tool means which can be easily utilized with an increasing number of sizes for hollow articles, such as pipe, yet without involving complicated or cumbersome apparatus. Instead of adjusting the blade angle by realigning the blade with respect to the blade support, the invention provides automatic adjustment between the carriage and its support as the tool is adapted to be used on a different size pipe. This, in addition to other advantages, permits a larger number of pipe size settings without requiring extra parts or cramping complicated adjusting means into the blade support area.

The figures illustrate the best embodiments of the invention which are presently contemplated.

In the drawings:

FIG. 1 is a side elevation of the tool of the invention shown in operative relation with a pipe end;

FIG. 2 is an end view of the tool;

FIG. 3 is a perspective view of part of the disassembled tool;

FIG. 4 is a sectional view taken on lines 4—4 of FIG. 1;

FIG. 5 is a side elevational view of the blade employed in FIG. 1;

FIG. 6 is a cross section of the blade taken at lines 6—6 of FIG. 5; and

FIG. 7 is a side elevational view of a modified head bar and carriage assembly.

DESCRIPTION OF THE INVENTION

In FIG. 1, a spigot-forming tool 1 is shown as positioned in surface-tapering relation with a glass-fiber-reinforced pipe 2. The tool 1 may be formed of metal parts.

The tool includes a pipe-supporting mandrel cylinder 3 which has a cylindrical wall providing a pipe support surface 4 and an end wall 5 connected to the cylindrical wall and positioned at the open end of the pipe 2 when in operation. To cooperate with pipe 2, cylinder 3 is of a diameter slightly smaller than the inner diameter of the pipe, so as to provide support for the pipe as against forces acting inward, but having sufficient clearance so as to avoid any stress on the pipe wall and to permit cylinder 3 to rotate within pipe 2. In operation, the cylinder is in axial alignment with the longitudinal axis of the pipe and thus serves as a reference part to maintain the operating position of tool 1.

For use with different size pipes, a plurality of cylinders 3 are provided for the tool, each one being of a diameter corresponding to the inner diameter of a particular size pipe. In the illustrated embodiment, six cylinders would be provided, but only one is shown.

A head bar 6 is attached to cylinder 3 by a threaded bolt 7 which extends through a threaded hole in the center of end wall 5 and a corresponding hole in head bar 6. Each cylinder 3 has a central threaded hole in its end wall to receive bolt 7.

Head bar 6 is an elongated rectangular member extending at right angles to the longitudinal axis of cylinder 3 and provides flat carriage-supporting surfaces 8 on the lengthwise four sides. The bar can be a solid member or otherwise have end walls at 9 to which handles 10 are secured in any suitable manner. By manipulating handles 10, bar 6 and cylinder 3 are rotated. Instead of handles, it would be possible to include a suitable motor-driven rotating means.

For purposes of positioning the cutting part of tool 1 longitudinally adjacent the upper surface of pipe 2, a blade carriage 11 is attached to head bar 6 and is thus mounted in operational relation to cylinder 3. Carriage 11 extends away from one of the support surfaces 8 of head bar 6 so that a longitudinal axis of the carriage is at nearly a right angle or nearly in longitudinal alignment with mandrel cylinder 3.

Carriage 11 is a solid member having a base portion 12 adapted to be disposed at a surface 8. Portion 12, in accordance with flat surfaces 8, is also flat. In the body of the carriage, a blade channel 13 is provided and extends along a longitudinal line of carriage 11 which line is at a cutting edge normally disposed adjacent the pipe outer surface.

Channel 13 is adapted to receive a cutting blade 14 which is elongated and extends outwardly from the cutting edge of carriage 11 and along a line generally aligned with the longitudinal axis of cylinder 3. To keep blade 14 in position, a clamp 15, also adapted to fit in channel 13, is attached as by screws 16 to carriage 11 and is then contiguous with the body of blade 14.

Blade 14 may be made of tungsten carbide and has two lengthwise cutting edges 17 and 18 formed by beveling two lengthwise sides of the otherwise generally regular body of the blade. A heel surface 19 and a knife surface 20 are thus formed along the opposite surfaces of the blade body. In order to insure that one of the cutting edges 17 or 18 is positioned to knife into the pipe surface in the normal clockwise rotation of handles 10, channel 13 has a beveled upper edge 21 complementing edges 17 and 18. If blade 14 is inserted backwards, one of the edges 17 or 18 will be disposed lower than the edge of a mandrel 3, preventing carriage 11 from being placed in operating position. Thus, to fit blade 19 into channel 13, knife surface 20 must always be positioned toward the cutting direction rather than having heel surface 19 at the cutting position.

By tightening screws 16, blade 14 is secured in a singular cutting position. There is no adjustment needed with respect to carriage 11. It is contemplated that this singular position would be parallel to the cutting edge of carriage 11 so that an equal amount of knife surface 20 protrudes from channel 13 all along the cutting edge. Thus, if no taper were desired for the spigot end of pipe 2, carriage 11 could be simply attached to head bar 6 with flat base portion 12 resting against a flat surface 8 of the bar. In this case, carriage 11 would extend at a right angle to bar 6 and the cutting edge and blade 14 would be in alignment with the longitudinal axis of cylinder 3 and pipe 2.

In accordance with the invention, the attachment of carriage 11 to head bar 6 determines the angle which blade 14 assumes with respect to the longitudinal axis of cylinder 3. For various size pipes and cylinders 3, a plurality of attachment positions are provided, each having a suitable hole 23 through which a bolt 24 may be disposed. Bolt 24 has a threaded end and a cooperating threaded opening 25 in base portion 12 of carriage 11 receives this bolt to secure the carriage to head bar 6 at any one of the desired position. In the examples shown, six positions or support surfaces 8 are provided, two each in three of the flat surfaces of head bar 6. This construction necessitates two holes opening centrally of each side of head bar 6 for connection to cylinder 3 by bolt 7. Thus, any attachment position on one of the surfaces 8 may be disposed in proper relation to the pipe.

An advantageous manner of disposing carriage 11 at the desired angle for the variety of attachment positions is provided by this embodiment. For this purpose, carriage 11 has two bearing spacers 26 disposed in complementary recesses 27 in base portion 12 to serve on a guide-surface portion for engaging a corresponding portion of the head. Bearing spacers 26 are uniformly sized, solid rollers or cylinders which may be constructed of any suitable material commonly used in bearings. Each extends laterally outwardly of its recess 27 the same selected distance greater than a radius thereof, thus providing a rounded bearing surface 28, which is more than a one-half cylinder surface. This construction assures that a flat surface 8 and flat base portion 12 will not be engaged when in the usual attaching positions. The spacers are preferably secured as by welds in recesses 27.

Each attaching position at a surface 8 has two bearing grooves 29 and 30, the first groove 29 being toward the cylinder 3 from the second groove 30. The grooves serve as an orientation of a surface 8 and extend laterally across the respective surface 8 to both sides of a respective hole 23 in order that spacers 26 will be received by the grooves when holes 23 and 25 are aligned.

Both grooves 29 and 30 are machined in surface 8 to complement a portion of a bearing surface 28 on a corresponding spacer 26. To provide the desired taper angle, second groove 30 will be machined to a greater depth than groove 29 so as to receive more of its corresponding spacer 26 and to thus dispose carriage 11 at an angle. As seen in FIG. 1, this difference in depth can be determined by the tangent line 31 between the two grooves, which tangent should be at the desired taper angle with respect to a perpendicular line from the longitudinal axis of cylinder 3. The angle of tangent line 31 is thus determinative of the taper angle of carriage 11 and blade 14.

The same is true of the other sets of grooves 29 and 30 at the other attachment positions. Each will have the grooves machined to provide a variety of taper angles. The exact angles must be determined by the pipe manufacturers' or other experts' specifications who would take into consideration the optimum taper for best spigot-bell bonding for a particular size pipe having a specified wall thickness. It would be expected that each size pipe would have a specified taper which would be different for another size pipe. Thus, each attachment position will correspond to a pipe size to position blade 14 in operative relationship with a pipe of that size and grooves 29 and 30 will be machined to depths which dispose the blade via carriage 11 at the specified taper angle.

OPERATION

In operation, the improved spigot tool 1 of the invention is first assembled within a specified pipe 2 by selecting a proper size cylinder 3, attaching head bar 6 thereto and inserting the cylinder portion into the open pipe end. Head bar 6 must be attached so that the proper surface 8 corresponding to the specified pipe is disposed facing the open end of pipe 2.

Then, blade 14 is inserted into channel 13 in accordance with the bevel edge 21 and clamped in by clamp 15. The proper surface 8 having a set of grooves 29 and 30 are selected and carriage 11 is fitted to surface 8 on bar 6 by inserting bearing spacers 26 into grooves 29 and 30 so that blade 14 is in operative position adjacent the outer pipe surface. Bolt 24 is then tightened to carriage 11 to secure the carriage in this position.

The tool is now ready for operation in forming a spigot end. Handles 10 will be manipulated to engage blade 14 into the pipe surface and gradually trim off the glass-fiber-reinforced plastic material on the pipe end to reduce the wall thickness and produce a tapered spigot end in accordance with the specified values.

For pipes of different sizes, the same operation is repeated with selection of the proper cylinder 3 and corresponding set of grooves 29 and 30. Thus, the device is automatically adjusted to the proper taper angle for a specified pipe merely by attaching carriage 11 in operative position for the particular pipe.

MODIFICATIONS

It is possible to achieve the desired features of automatic adjustment of taper angle with pipe size by modified forms of the embodiment shown in FIGS. 1-6.

In the embodiment illustrated by FIG. 7, the parts are generally the same as previously described except for the attaching arrangement which determines the angle of the carriage attachment. Identical parts are identified by the same numbers as in FIGS. 1-6.

In this modified construction, a base portion 12 of carriage 11 has a flat surface 32 as before, but has no recesses or bearing spacers so that surface 32 serves as the guide surface portion. The cutting edge of carriage 11 is at right angles to flat surface 32.

A modified head bar 33 is adapted to be attached to a cylinder as in the other embodiment and has torque means illustrated by handles 10 as before. The bar has the same general configuration as before, excluding the modifications described below.

To attach carriage 11 in operative relation to a varied number of pipes of different sizes, a plurality of attachment surfaces 34, shown as 3 in number, are provided in bar 33. Each surface 34 is adapted to receive in a contiguous relation the full surface 32. To simplify manufacture, surfaces 34 may be merely a tapered face on bar 33. Each surface 34 has a central hole 35 through which a bolt 36 extends and is threaded into a corresponding opening in carriage 11 to attach the carriage as before. As shown, more than one hole 35 may be provided to permit use of the same taper surface for different size pipes. The portion of surfaces 34 at both sides of a hole 35 serves as the orientation portion to determine the taper angle. For this purpose, each surface is inclined with respect to a perpendicular line from the longitudinal axis of cylinder 3. The angle of inclination corresponds to the specified taper angle for that pipe size.

The operation of this modified construction is the same as before, except that carriage 11 is attached by engaging its flat surface 32 with a selected inclined surface 34 and the bolt is then tightened.

Other variations, such as employing different shapes of spacers and grooves or different abutting parts between the carriage and bar, may still provide the essential inclined attachment angle for the carriage, although the embodiments illustrated show advantageously simple yet reliable connections. Also, it would be recognized that if for some reason the head is not perpendicular to the axis, the angles of inclination for the carriage attachment will be altered to compensate.

The several embodiments described are presently the best examples contemplated of the various modes of the invention. The claims define the scope of the invention.

We claim:

1. In a tool for tapering the outside surface of an open end of a tubular article, the tool having a reference part adapted to be longitudinally aligned with the article and to maintain the tool in operating relation with respect to the open end of the article; the assembly comprising:

a head connected with the reference part and extending at a predetermined head angle with respect to the reference part, the head having a plurality of carriage-support surfaces corresponding to a variety of article sizes;

a blade carriage having a cutting blade secured thereto, the carriage being removably attached at any one of the support surfaces to dispose the cutter blade in operative relation to the article;

a plurality of rigid spacer members disposed between the carriage and a support surface in assembly, the spacers extending beyond the carriage a predetermined distance; and each carriage-support surface having a set of grooves recessed therein, the number in a set corresponding to the plurality of spacer members, the grooves being recessed to depths determined by a line having a predetermined mixture with respect to the head, and the spacer and each set of grooves cooperating to interlock and space the carriage at a predetermined carriage angle related to the head angle to dispose the cutter blade at a taper angle predesignated for each article size.

2. The structure defined by claim 1, wherein:

the head is aligned perpendicularly to the reference part;

the cutter blade has a straight cutting edge;

the carriage has a base portion adapted to be attached at any of the support surfaces, the spacer members protrude from the base portion, said predetermined distance being to a line perpendicular to the cutting edge; and the grooves in each carriage-support surface are recessed to depths which are determined by a line which is at said predesignated taper angle with respect to the head alignment for each carriage setting.

3. In a spigot-forming tool for tapering the ends of a variety of plastic pipes having different diameters, the tool being adapted for use with a plurality of reference parts, each having a cylindrical surface adapted to be inserted in longitudinal axial alignment within a pipe end of a particular diameter; the improved combination comprising:

A head bar selectively attachable to each of said reference parts, the head bar providing a plurality of carriage settings, and having a support surface spaced to correspond to a reference part, at each setting;

a carriage removably attachable to each of the carriage-support surfaces, the carriage carrying a cutter blade spaced adjacent a cylindrical surface of a selected reference part at a corresponding carriage setting in assembly; and connecting means for removably attaching the carriage to any of said support surfaces as selected, the connecting means being constructed to incline the cutter blade at a predetermined taper angle with respect to the alignment of the cylindrical surface for each selected reference part and corresponding carriage setting, the angles being predetermined in accordance with the variety of pipe diameters.

4. The combination of claim 3, wherein:

the connecting means includes rigid spacer bearings attached to the carriage and disposed to maintain a space between the carriage and head in assembly; and bearing grooves are recessed in each of the carriage support surfaces; the grooves being of depths to receive portions of the spacer bearings and incline the carriage and cutter blade.

5. The combination of claim 4, wherein:

the cutter blade has a straight cutting edge;

the carriage has a base surface facing the selected support surface when assembled for operation, the bearing spacers protrude from the base surface a distance to a line which is at a predetermined angle with respect to the cutting edge; and the grooves in each support surface are recessed to depths permitting varying portions of the bearing spacers to be received therein to determine said incline of the cutter blade.

6. The combination defined by claim 5, wherein:

the bearing spacers protrude to a line which is perpendicular to the cutting edge; and the grooves in each support surface are recessed to depths determined by a line extending at a corresponding predetermined taper angle with respect to a perpendicular to the longitudinal axis of said cylindrical surface.

7. The combination of claim 3, wherein the blade is beveled and is attached in a complementary channel in the carriage, the channel has a beveled reference edge at the top, the edge complementing the bevel of the blade to permit the blade to be inserted in said channel in a predesignated position.

8. In a tool for reducing and tapering the wall a reference part adapted to be aligned with a longitudinal axis of the tubular article; the improved assembly comprising:

a head connected with the reference part and having a portion extending laterally of the reference part at the open end of the article being operated on, the head having a plurality of carriage-support surfaces corresponding to a variety of article sizes, each said support surface including a orientation portion formed at a different predetermined angle of incline correlated to the corresponding article size;

a blade carriage removably attached to said head at a selected one of said support surfaces, said carriage having a guide-surface portion engaging said orientation portion at said selected-support surface, and said carriage extending longitudinally over the reference part; and a cutter blade fixed to said blade carriage in operational relation to the article, said blade being disposed at a desired taper angle for each article size by said guide surface and orientation surface when said carriage is attached to the corresponding support surface.

9. In a tool for reducing the wall thickness on an open end of a tubular article, the tool having a reference part adapted to be longitudinally aligned within the open end; the improved assembly comprising:

a head connected with the reference part and extending laterally at a first predetermined angle to the reference part, and the head having a plurality of carriage-support surfaces corresponding to a variety of article sizes;

a blade carriage having a cutting blade secured thereto;

a base portion on said carriage and adapted to be removably attached to any one of said support surfaces of the head to dispose the cutting blade in operative relation to the article;

at least two rigid spacers connected with said base portion, said spacers having bearing surfaces extending outwardly of said base portion; and each said support surface having a number of bearing grooves corresponding to said spacers, said grooves being complementary in shape and position to the bearing surfaces for interlocking said spacers and grooves in assembly, and said grooves being machined to predetermined depths to receive only that portion of the corresponding bearing surfaces which serve to space said carriage from said head at a second predetermined angle to dispose the cutting blade at a desired taper angle with respect to the reference part in cooperation with said first predetermined angle, whereby a plurality of taper angles are provided in accordance with carriage settings for the variety of article sizes.

UNITED STATES PATENT OFFICE
CERTIFICATE OF CORRECTION

Patent No. 3,603,182     Dated Sept. 7, 1971

Inventor(s) Robert M. Jackman and William N. McDonald

It is certified that error appears in the above-identified patent and that said Letters Patent are hereby corrected as shown below:

Column 4, line 28,     Cancel "one-half" and substitutue therefor ---half---

Column 7, line 17,     After "wall" insert ---thickness on an open end of a tubular article, the tool having---

Signed and sealed this 23rd day of May 1972.

(SEAL)
Attest:

EDWARD M. FLETCHER, JR.            ROBERT GOTTSCHALK
Attesting Officer                  Commissioner of Patents